(12) United States Patent
Laor

(10) Patent No.: US 6,275,626 B1
(45) Date of Patent: Aug. 14, 2001

(54) 1XN REFLECTOR SWITCH

(76) Inventor: Herzel Laor, 2050 Hillsdale Cir., Boulder, CO (US) 80303

( * ) Notice: Subject to any disclaimer, the term of this patent is extended or adjusted under 35 U.S.C. 154(b) by 0 days.

(21) Appl. No.: 09/425,257

(22) Filed: Oct. 22, 1999

Related U.S. Application Data

(60) Provisional application No. 60/105,640, filed on Oct. 26, 1998.

(51) Int. Cl.[7] ....................................................... G02B 6/26
(52) U.S. Cl. ................................................. 385/18; 385/16
(58) Field of Search .................................. 385/15, 16, 18, 385/22, 31

(56) References Cited

U.S. PATENT DOCUMENTS

| | | |
|---|---|---|
| 4,378,144 | 3/1983 | Duck et al. . |
| 4,896,935 | 1/1990 | Lee . |
| 5,005,934 | 4/1991 | Curtiss . |
| 5,090,791 | 2/1992 | Kidder et al. ........................... 385/18 |
| 5,173,958 | 12/1992 | Folsom et al. ......................... 385/36 |
| 5,420,946 | 5/1995 | Tsai ....................................... 385/22 |
| 5,420,953 | 5/1995 | Boudreau et al. ..................... 385/88 |
| 5,481,631 | 1/1996 | Cahill et al. ........................... 385/18 |
| 5,629,993 | 5/1997 | Smiley .................................. 385/22 |
| 6,009,219 | 12/1999 | Doyle .................................... 385/23 |

Primary Examiner—James Phan
(74) Attorney, Agent, or Firm—David W. Collins

(57) ABSTRACT

A fiber optics switch has a retro-reflector mirror assembly which reflects a light beam received from an input fiber in an anti-parallel, displaced manner, into one of a plurality of output fibers. Insensitivity to temperature changes, wear and tear, and vibration is achieved as well as very compact size and high speed.

15 Claims, 3 Drawing Sheets

1×N REFLECTOR SWITCH

CROSS-REFERENCE TO RELATED APPLICATION

The present application is a non-provisional application, and claims priority based on provisional application, Ser. No. 60/105,640, filed on Oct. 26, 1998.

TECHNICAL FIELD

The present invention is directed generally to fiber optic switches and, in particular, to 1×N and dual 1×2 switches with minimal optical losses that can accommodate a large number of possible switch connections, e.g., N may range from 2 to 100 or so, using reflection of the optical beam to achieve switching, especially having improved switching speed and repeatability.

BACKGROUND ART

Many types of fiber optics switches are in the market now. A number of patents are exemplary of the type of optical switches currently commercially available; see, e.g., U.S. Pat. No. 4,378,144, entitled "Optical Switch" and issued on Mar. 29, 1983, to G. S. Duck et al; U.S. Pat. No. 4,896,935, entitled "Fiber Optic Switch" and issued on Jan. 30, 1990, to H.-S. Lee; U.S. Pat. No. 5,005,934, entitled "Fiber Optics Channel Selection Device" and issued on Apr. 9, 1991, to L. E. Curtiss; and U.S. Pat. No. 5,420,946, entitled "Multiple Channel Optical Coupling Switch" and issued on May 30, 1995, to J.-H. Tsai. To make a compact design, the fibers may be arranged differently, see, e.g., U.S. Pat. No. 5,629,993, entitled "Compact Optical Switch" and issued on May 13, 1997, to J. O. Smiley.

All of the foregoing designs depend on difficult-to-attain precise mechanical alignment. For example, in U.S. Pat. Nos. 4,378,144, 4,896,935, 5,420,953, and 5,629,993, the alignment is between moving and stationary parts, while in U.S. Pat. No. 5,005,934, the alignment is between stationary parts which are far away from each other.

U.S. Pat. No. 5,173,958, entitled "Beam Distributor for Laser-to-Optical Fiber Application" and issued on Dec. 22, 1992, to M. F. Folsom et al, discloses an eccentrically mounted retroreflector prism in a cylindrical housing having a plurality of lenses and associated optical fibers distributed about the central axis of the housing. The prism is driven to revolve about the central axis and, as it does so, to sequentially direct a beam which is incident along the central axis to respective lenses and optical fibers in turn, by retroreflection. A drawback with this arrangement is the use of a prism retroreflector comprising a bulk prism. Such a bulk prism adds weight to the system and its front face introduces unwanted light reflection.

U.S. Pat. No. 5,481,631, entitled "Optical Switching Apparatus with Retroreflector" and issued on Jan. 2, 1996, to J. E. Cahill et al, discloses use of a retroreflector, or corner cube reflector, mounted on a stepper motor to be selectively positioned so as to direct light from one optical fiber to another. However, the reference does not describe how the retroreflector is constructed.

Thus, what is needed is a fiber optics switch where all alignments are between parts that are in relatively close proximity to each other and do not have relative motion. Ideally, a compact design is desired, to reduce space requirements. Also ideally, the optical fibers should be stationary. Finally, the retroreflector must be reconfigured to reduce weight and increase switching speed.

DISCLOSURE OF INVENTION

In accordance with the present invention, a 1×N reflector switch for switching an optical signal from one optical fiber to any of N optical fibers is provided. The 1×N reflector switch comprises:

(a) an input beam-forming unit, situated along an axis and comprising the optical fiber and a lens secured thereto, the input beam-forming unit emitting an optical input signal;

(b) N output beam-forming units disposed around the axis and parallel to the input beam-forming unit, the output beam-forming units each comprising an optical fiber and a lens secured thereto, each output beam-forming unit accepting an optical output signal;

(c) a truncated, hollow reflector assembly for reflecting the input optical signal from the input beam-forming unit to any of the N output beam-forming units; and (d) a mechanism for rotating the reflector assembly to align the input optical signal from the input beam-forming unit with any of the output beam-forming units.

Also in accordance with the present invention, a 1×2 reflector switch for switching optical signals from a first set of two optical fibers to a second set of optical fibers is provided. The 1×2 reflector switch comprises:

(a) three beam-forming units, each comprising an optical fiber and a lens secured thereto, beam-forming units disposed on three corners of a square symmetrically disposed about an axis, with one beam-forming unit thereby having two adjacent neighboring beam-forming units;

(b) two rotatable reflector assemblies, in parallel, disposed symmetrically about the axis, arranged such that an optical signal from the one beam-forming unit is reflected into one of the adjacent beam-forming units, and, upon 90° rotation of the two rotatable reflector assemblies, the optical signal is reflected into the other of the adjacent beam-forming units; and (c) a mechanism for rotating the two rotatable reflector assembly to alternately align the optical signal between the two adjacent beam-forming units.

Further in accordance with the present invention, a dual 1×2 reflector switch, or 2×2 reflector switch, for switching optical signals from a first set of two optical fibers to a second set of optical fibers is provided. The dual 1×2 reflector switch comprises:

(a) two first beam-forming units and two second beam-forming units symmetrically disposed in a square about an axis, each beam-forming unit comprising an optical fiber and a lens secured thereto, with the two first beam-forming units diagonally disposed about the axis;

(b) two rotatable reflector assemblies, in parallel, disposed symmetrically about the axis, arranged such that the optical signal from each first beam-forming unit is reflected into each one of the second beam-forming units, respectively, and, upon 90° rotation of the two rotatable reflector assemblies, the optical signals are each reflected into each other of the second beam-forming units, respectively; and (c) a mechanism for rotating the two rotatable reflector assembly to alternately align the optical signal between the first set of second beam-forming units and the second set of beam-forming units.

The present invention is directed to a fiber optics switch design in which all alignments are between parts that are in close proximity to each other and do not have relative motion. As a side benefit, very compact design is achieved, for example, on the order of about 25 mm diameter for a completed switch. Also, the fibers are stationary, which improves their life.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

FIG. 2b is a perspective view of the mirror assembly of FIG. 2a;

BEST MODES FOR CARRYING OUT THE INVENTION

Reference is now made in detail to a specific embodiment of the present invention, which illustrates the best mode presently contemplated by the inventor for practicing the invention. Alternative embodiments are also briefly described as applicable.

Figure 1A:
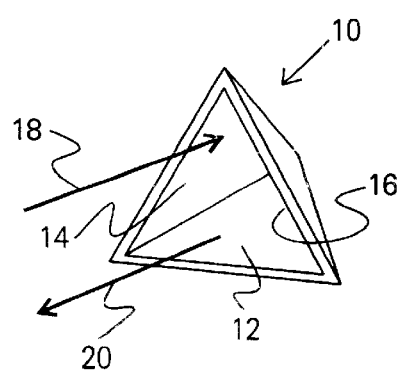
FIG. 1a is a perspective view of a known three-mirrored corner cube, in which the three mirrors are perpendicular to each other.

A well-known design for reflecting light beam in anti-parallel fashion is the corner cube reflector. The corner cube comprises three mirrors, which are perpendicular to each other. FIG. 1a depicts such a corner cube reflector (retroreflector) 10, comprising three mirrors 12, 14, and 16. An incoming, or input, beam 18 enters the corner cube 10 and emerges as outgoing, or output, beam 20.

Figure 1B:
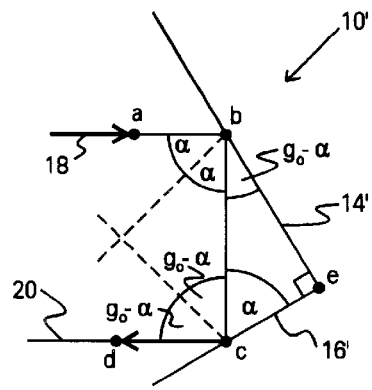
FIG. 1b is a two-dimensional simplified cut-away, depicting the ray path in the case of two mirrors, perpendicular to each other.

In FIG. 1b, a two-dimensional simplified cut-away is shown, comprising a mirror system 10' having two mirrors 14' and 16'. If b-e-c, the angle between the two mirrors 14', 16', is a right angle, then a–b (incoming beam 18) is parallel and in the reverse direction to c–d (outgoing beam 20). In three dimensions, three mirrors assembled in such a way that each is perpendicular to the other two, as in the cube mirror 10 of FIG. 1a, will create similar results. Since the output beam 20 is parallel to the input beam 18, but traveling in the opposite direction, the output beam is often referred to as an "anti-parallel" beam.

Figure 1C:
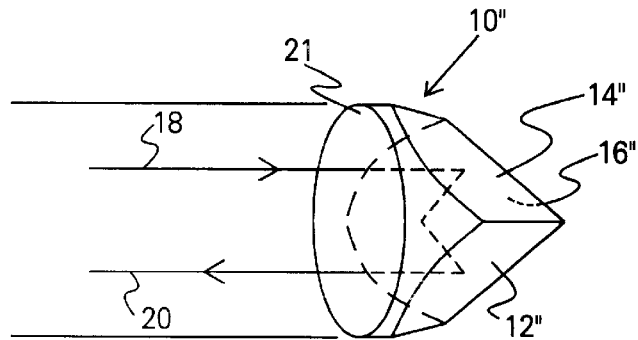
FIG. 1c is a perspective view of a known solid glass corner cube reflector (retroreflector)

A common way to construct a corner cube reflector 10" is to use a block of glass and make three perpendicular surfaces 12", 14", 16" as seen in FIG. 1c. Incoming beam 18 enters the cube through surface 21, is reflected three times, and exits as outgoing beam 20. The surfaces 12", 14", 16" naturally reflect light by total internal reflection (TIR), or are coated with reflective material on the back side (back surface reflection). Surface 21 is usually coated with an anti-reflective (AR) coating to minimize light loss at the air-glass interface.

Figure 2A:
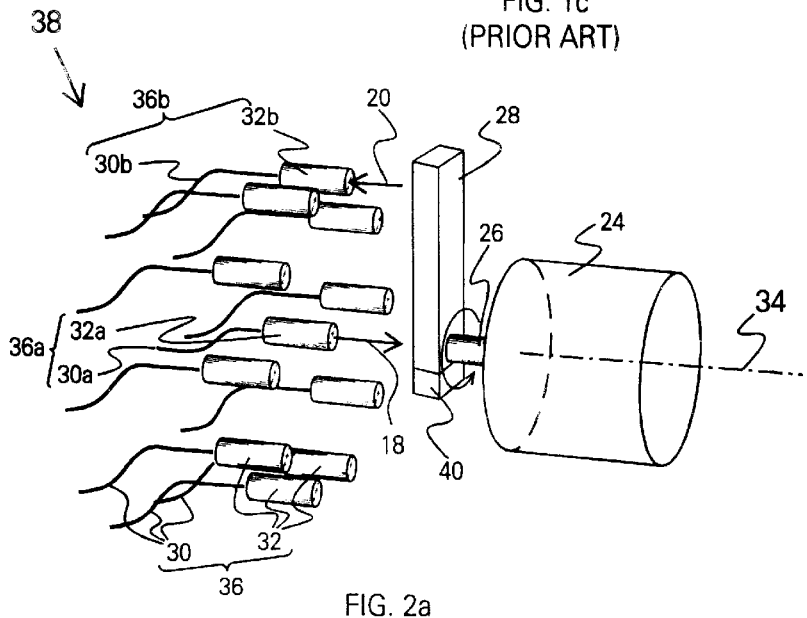
FIG. 2a is a perspective schematic diagram of apparatus in accordance with the present invention, including a mirror assembly, for switching from one fiber to another.

In order to use the corner cube design in a fiber switch, a motor is used with three mirrors attached to the shaft in an arrangement that reflects and displaces the beam. FIG. 2a shows such a fiber switch 22, comprising a motor 24 having a rotating shaft 26 to which a mirror assembly 28 is attached. A plurality of optical fibers 30, each connected to a lens 32 are arranged parallel to each other, about the axis 34 of the shaft 26. An incoming beam 18 is reflected in the mirror assembly 28 and emerges as outgoing beam 20. In this way, light from one optical fiber, here denoted 30a, is switched to a second, selected optical fiber, here denoted 30b, through lenses 32a and 32b, respectively. Selection is achieved by merely rotating the mirror assembly 28 to the desired position to align a chosen beam-forming unit 36 with the output beam 20.

Specifically, one beam-forming unit 36a, comprising a fiber 30a mounted to a lens 32a, is positioned essentially on the motor axis 26, while N beam-forming units 36 are disposed in a circle around the axis. The mirror assembly 28 is positioned by the motor 24 to create a light path between the center fiber 30a and any selected one 30b of the N fibers 30.

It will be appreciated by those skilled in this art that when a connection is made between fiber 30a and fiber 30b, light can travel in both directions between the fibers. So light may travel from fiber 30a to fiber 30b as described, but light can also travel from fiber 30b to fiber 30a, and actually, light can go both ways simultaneously.

Any of the lenses commonly used in optoelectronics for coupling to fiber optics, including gradient refractive index (GRIN) lenses, may be employed in the practice of the present invention. Preferably, the connection of each optical fiber 30 to a lens 32 is achieved by fusion-splicing, as disclosed and claimed in application Ser. No. 09/118,033, filed on Jul. 17, 1998. In the fusion-splicing method, an optical fiber 30 is "welded" to a lens 32 by use of a laser beam, shaped into an annular beam around the fiber and heating the lens surface to a temperature sufficient to enable the fusion splicing to occur.

All the beam-forming units 36 may be positioned very near to each other in a rigid structure (not shown) that has a coefficient of thermal expansion similar to that of the GRIN lenses 32. As an example, a metal structure provided with slots sized for snugly securing the lenses 32 in place may be employed to maintain the lenses parallel to the axis 26, fabricated from, e.g., stainless steel or aluminum. In this way, the alignment between the beam-forming units 36 will stay accurate over temperature variations, wear and tear, vibrations, etc. The mirror assembly 22 may also be made very rigid, keeping good parallelism between incoming beam 18 and outgoing beam 20. The exact positioning of the mirror assembly 22 relative to the beam-forming units 36 is not critical, so long as the mirror assembly does not allow light to split between adjacent ones of the N beam-forming units.

Replacing a faulty motor 24 is simple, since only very crude alignment is required. Wear of the motor bearings will not create any optical mis-alignment. Similarly, vibration of the mirror assembly 28 relative to the beam-forming units 36 will not create any optical mis-alignment.

Depending on the number N and the size of the GRIN lenses 32, the circle of beam-forming units 36 may be smaller than the motor diameter, creating a miniature switch 38. The motor 24 may be a stepping motor, with the beam-forming units 36 aligned along its natural steps. Since the fibers are stationary and only the shaft 26 of the motor 24 rotates, the motor can have unlimited rotation without causing damage to the fibers 30, in contrast to the structure disclosed by Duck et al in U.S. Pat. No. 4,896,935. Some electrical or optical mechanism is required to know the shaft position. For example, indexer mechanisms (not shown), such as shaft encoders, are wellknown in the art for determining the position of the motor 24 at any given time.

Figure 2B:
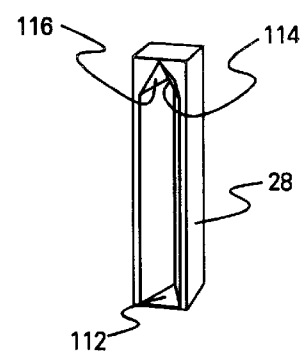

FIG. 2b depicts the mirror assembly 28, comprising three reflecting surfaces 112, 114, 116. The mirror assembly 28 may be made by assembling three separate mirrors 112, 114, 116 together, but for mass production, this could be unacceptably expensive. There are several ways in which the mirror assembly 28 could be fabricated. These include (1) replicated optics, (2) electro-discharge machine (EDM), (3) electro-forming, and (4) crystal etching, although this list is not all-inclusive.

In the replicated optics process, a negative structure "mold" is made with optical quality surfaces. A rough part is made. The mold is coated with the mirror materials in the reverse order to what is required; for example: first a release layer, then protective $SiO_2$, and then gold. The rough part is coated with an epoxy and is pressed upon the mold. After the epoxy sets, the parts are separated at the release layer. The release layer is removed from the part and the part (the mirror assembly 28) is ready.

In the EDM process, a mold is created as above. The mold is then brought near the rough part and a current is applied between them. The part is electrically etched to match the mold. Then, the part is removed and coated, for example, first with gold and then with the protective layer (e.g., $SiO_2$).

In the electro-forming process, a mold is made and then coated first with a release layer and then next with a thick layer of metal, usually nickel. The nickel part is removed and mirror-coated.

In the crystal etching process, a crystal substrate is etched along crystalline planes to achieve perpendicularity of the mirrors 112, 114, 116.

In any event, the mirror assembly, or retroreflector, 28 is hollow, in order to reduce weight and increase switching speed. By hollow is meant that there is no bulk glass prism, as disclosed in U.S. Pat. No. 5,173,958, supra, which adds weight and also reflects light. The hollow retroreflector alleviates the light reflection from the face of the bulk prism. The mirror surfaces in the hollow retroreflector are coated on the frontal surface of the material creating the mirror. This structure of mirror is commonly known as a "front surface" mirror. It has less light loss than other, back-surface, mirror structures.

Preferably, the retroreflector 28 is also truncated, in order to further reduce weight and increase switching speed. By truncated is meant that all mirror surfaces are not joined, as shown in the conventional corner cube reflector depicted in FIG. 1a. Instead, only that amount of mirror surface needed to reflect light is used. Further, it can be seen that mirror surface 112 is displaced a distance from mirror surfaces 114, 116; this displacement is equal to the radius of the outside beam-forming units 36b from the central beam-forming unit 36a.

The mirror surface 112 may be aligned with the central beam-forming unit 36a, thereby making the mirror surfaces 114, 116 aligned with the peripheral N beam-forming units 36. Alternatively, the mirror surface 112 may be aligned with the peripheral N beam-forming units 36, thereby making the mirror surfaces 114, 116 aligned with the central beam-forming unit 36a.

To make the mass of the mirror assembly 28 symmetric around the motor axis 34, a counter-weight 40 may be added to the end of the mirror assembly nearest the shaft 26.

Figure 3A:
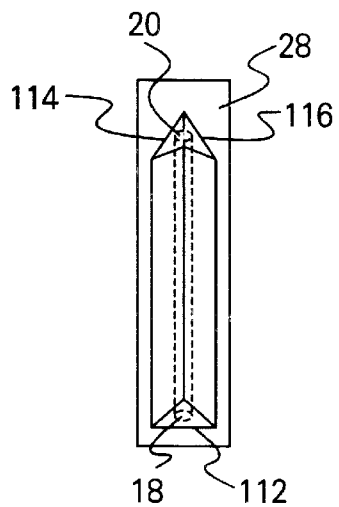
FIG. 3a is an enlarged view of a mirror assembly in which two mirrors associated with an output beam are precisely aligned with one mirror associated with an input beam so that light from the one mirror is reflected equally by the two mirrors.
Figure 3B:
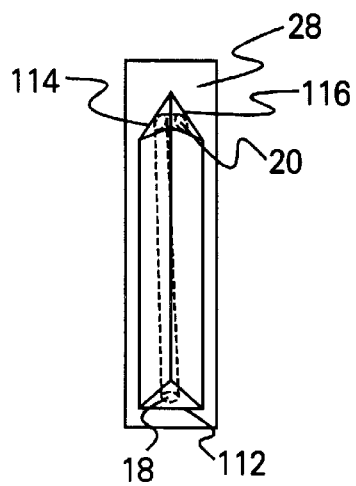
FIG. 3b a view similar to that of FIG. 3a, but with deliberate alignment in which light from the one mirror is directed to a first mirror of the other two mirrors and then to a second mirror of the other two mirrors.

Two enlarged drawings of the mirror assembly are seen in FIGS. 3a, 3b. In FIG. 3a, the beam 18 is shown coming into the first mirror 112, perpendicular to the plane of the paper and going into the plane of the paper. The beam 18 is folded by mirror 112 to reach the second mirror 114 and the third mirror 116. Here the beam is folded twice and is sent out of the plane of the paper as output beam 20.

The difficulty with the foregoing design is the line of contact between mirrors 114 and 116. If the line is not infinitesimal in width, light loss will ensue. To over-come this difficulty, the mirrors 112, 114, 116 may be arranged as shown in FIG. 3b. The beam 18 goes from mirror 112 to mirror 114 to mirror 116 without hitting the area between mirrors 114 and 116. It will be noted that a beam can propagate in the reverse direction to the shown in FIGS. 3a and 3b.

Figure 4:
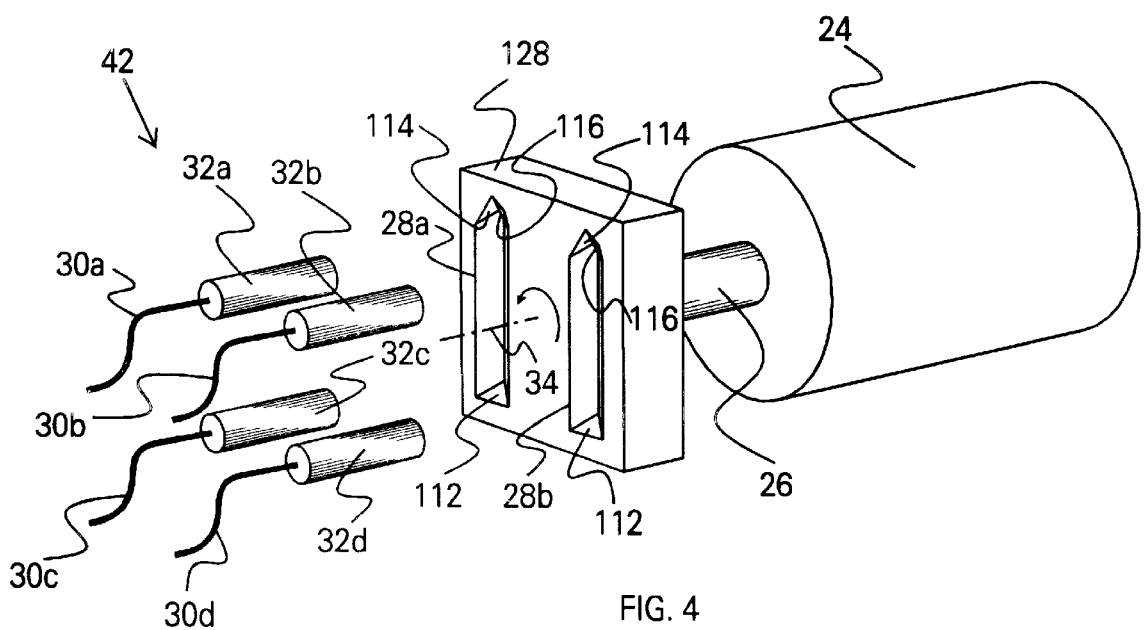
FIG. 4 is a view similar to that of FIG. 2, but depicting a by-pass switch, comprising 1×2 switches operated together.

In another application, a by-pass switch 42, which is essentially two 1×2 switches operated together, may be created, as shown in FIG. 4. The four beam-forming units, comprising optical fibers 30a, 30b, 30c, 30d and lenses 32a, 32b, 32c, 32d, respectively, are formed at the four corners of a square, which is symmetrically disposed about the rotation axis 34. This configuration is also known as a 2×2 switch. The mirror assembly 128 includes two sets 28a, 28b of three mirrors 112, 114, 116, each as described before. A rotational solenoid 24' could be used instead of a motor 24. Fibers 30a and 30d, being diagonally disposed on the corners of the square, form a first set of beam-forming units and fibers 30b and 30c then form a second set of beam-forming units. In the shown position, fiber 30a is connected to fiber 30c (the connection is a–c) and fiber 30b connected to fiber 30d (the connection is b–d). If the mirror assembly 128 is rotated 90 degrees, the connection will then be a–b and c–d.

As can be seen from FIG. 4, a 1×2 switch 42 could be made by using only three optical fibers, say 30a, 30b, 30c, employing the mirror assembly 128. The fourth optical fiber 30d is omitted, but the remaining three optical fibers are in the same spaced configuration as depicted in FIG. 4. In such a case, an optical signal could be rapidly switched from optical fiber 30a to either optical fiber 30b or 30c.

Figure 5:
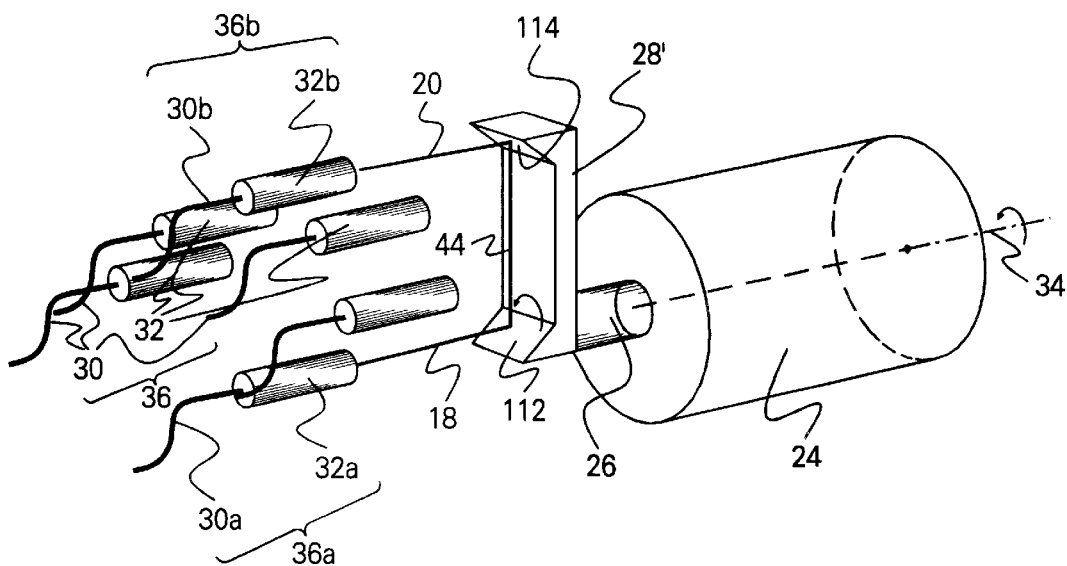
FIG. 5 is a view similar to that of FIG. 2, but depicting the use of two mirrors instead of three mirrors for lower quality switches.

Two mirrors 112, 114 may be used instead of three mirrors 112, 114, 116 in the mirror assembly 28', as depicted in FIG. 5. In this case, the light beam 18 will be reflected in an anti-parallel path 20 to the incoming unit 36a only if the incoming beam 18 is perpendicular to the line 44 of intersection of the mirrors 112, 114. This requires more precision from the alignment between the mirror assembly 28' and the beam-forming units 36 to achieve the same performance of the three mirror design. This design, however, may be useful for lower quality switches.

INDUSTRIAL APPLICABILITY

The 1×N and dual 1×2 reflector switches of the present invention is expected to find use in a myriad of optoelectronic applications, data communications, and telecommunications.

Thus, there have been disclosed 1×N and dual 1×2 reflector switches. It will be readily apparent to those skilled in this art that various changes and modifications of an obvious nature may be made, and all such changes and modifications are considered to fall within the scope of the present invention, as defined by the appended claims.

What is claimed is:

1. A 1×N reflector switch for switching an optical signal from one optical fiber to any of N optical fibers, comprising:
   (a) a first beam-forming unit, situated along an axis and comprising said optical fiber and a lens secured thereto;
   (b) at least two second beam-forming units disposed around said axis, parallel to said first beam-forming unit and spaced a fixed distance therefrom, said second beam-forming units each comprising an optical fiber and a lens secured thereto;
   (c) a hollow reflector assembly for reflecting said optical signal from said first beam-forming unit to any of said second beam-forming units, said reflector assembly comprising three front surface mirrors disposed perpendicular to each other, with a first mirror spaced apart from a second mirror and a third mirror by a fixed distance and with said second and third mirrors adjacent each other, to reflect said optical signal to form an anti-parallel optical signal; and
   (d) a mechanism for rotating said reflector assembly to align said optical signal between said first beam-forming unit with any said second beam-forming unit.

2. The 1×N reflector switch of claim 1 wherein said first mirror is aligned with said first beam-forming unit and wherein said second mirror and said third mirror are aligned with said at least two second beam-forming units.

3. The 1×N reflector switch of claim 1 wherein said first mirror is aligned with said at least two second beam-forming units and wherein said second mirror and said third mirror are aligned with said first beam-forming unit.

4. The 1×N reflector switch of claim 1 wherein said three mirrors are truncated to save weight.

5. The 1×N reflector switch of claim 1 wherein said reflector assembly comprises replicated optics mirrored surfaces.

6. The 1×N reflector switch of claim 1 wherein said reflector assembly comprises electro-discharge machined mirrored surfaces.

7. The 1×N reflector switch of claim 1 wherein said reflector assembly comprises electro-formed mirrored surfaces.

8. The 1×N reflector switch of claim 1 wherein said reflector assembly comprises etched crystal mirrored surfaces.

9. The 1×N reflector switch of claim 1 wherein said rotating mechanism includes a shaft encoder.

10. The 1×N reflector switch of claim 1 wherein said optical signal comprises telecommunications information.

11. The 1×N reflector switch of claim 1 wherein at least one of said lenses has a gradient in its index of refraction.

12. The 1×N reflector switch of claim 1 wherein at least one said beam-forming unit comprises said optical fiber fusion-spliced to said lens.

13. The 1×N reflector switch of claim 1 wherein said second beam-forming units are disposed symmetrically in a circle about said axis.

14. The 1×N reflector switch of claim 1 wherein said first beam-forming unit and said second beam-forming units are maintained in a rigid structure having a coefficient of thermal expansion similar to that of said lenses.

15. The 1×N reflector switch of claim 1 wherein N is in a range of 2 to 100.

* * * * *